Figures 1, 2:
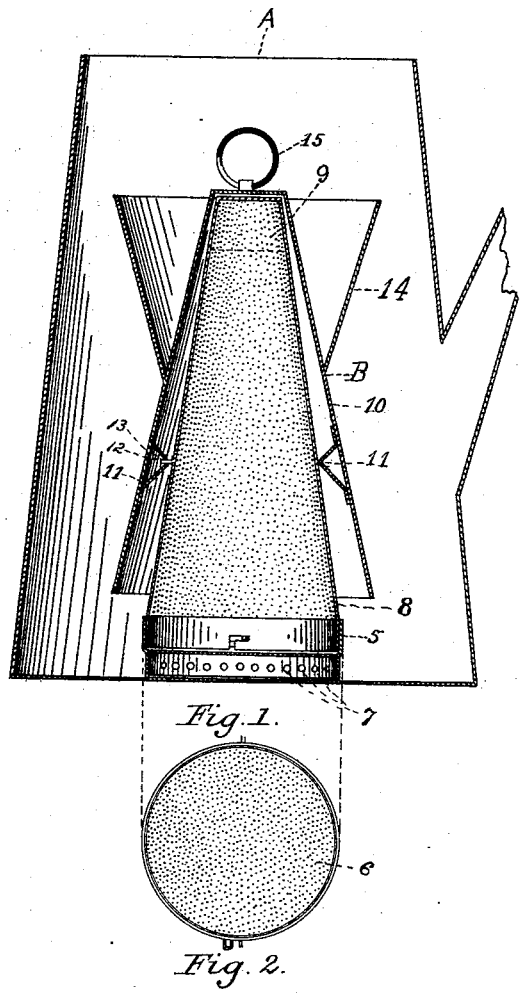

(No Model.)

G. E. OVERMAN.
COFFEE STEEPER.

No. 484,447. Patented Oct. 18, 1892.

Witnesses:
L. G. Susemihl
T. A. Murphy

Inventor.
George E Overman
per Wm K White
Attorney

UNITED STATES PATENT OFFICE.

GEORGE E. OVERMAN, OF ROCK ISLAND, ILLINOIS.

COFFEE-STEEPER.

SPECIFICATION forming part of Letters Patent No. 484,447, dated October 18, 1892.

Application filed March 8, 1892. Serial No. 424,244. (No model.)

*To all whom it may concern:*

Be it known that I, GEORGE E. OVERMAN, a citizen of the United States, residing at Rock Island, in the county of Rock Island and State of Illinois, have invented a new and useful Improvement in Coffee-Steepers, of which the following is a specification.

My invention relates to that class of coffee-steepers which are inserted within a coffee-pot; and the object of my improvement is to prevent the aroma of the coffee from escaping with the steam by rapidly condensing the steam. I accomplish this object by the mechanism illustrated in the accompanying drawings, in which—

Figure 1 is a view of a vertical section of a coffee-pot and my improved coffee-steeper, and Fig. 2 is a plan view of the perforated bottom of the coffee-steeper.

Similar letters and numerals of reference refer to similar parts throughout both the views.

A represents an ordinary coffee-pot.

B represents my improved coffee-steeper. The several parts composing the same I will now describe.

5 is a hoop, which also serves as the base of my coffee-steeper. Within such hoop, about midway, is a perforated bottom 6, and the lower portion of the hoop has several openings or perforations therein, as at 7, so that it will rest upon the bottom of the coffee-pot when such coffee-pot contains water, as hereinafter described. The cone 8 is arranged so that its base will fit snugly in the upper portion of the hoop, and, if desired, so that it may be temporarily locked or secured therein by any suitable arrangement. The portion of such cone above the hoop is finely perforated, as shown by the dots in the drawings. For convenience in washing the cone after its use I prefer to provide the top with a close-fitting cap 9, which may be removed at pleasure. The cone 10, being the outer cone, is in diameter greater than the cone 8, so that when placed over the latter a space, as shown in Fig. 1, is left between the two cones, and for this purpose I place three or more stops 11 within the cone 10, the ends of which bear against the inner cone 8 to keep such cones in position, as also shown in Fig. 1.

For the purpose of securing the cones together I attach to the cone 8 a projecting pin 12 and also provide a registering cross-slot 13 in one of the stops, so that such pin may enter the slot by turning the outer cone 10, and thereby prevent said cones from being disengaged. Any other suitable method for temporarily securing the cones together in position may be adopted.

The flaring cup or receptacle 14 is secured to the outside of the cone 10 near its center, as is also shown in Fig. 1, the walls of which cup or receptacle extend to about the top of the cone 10, such cup or receptacle being used for receiving chipped ice or cold water, for the purpose hereinafter explained.

For convenience in handling I attach to the top of cone 10 a bail or handle 15.

In using my device I remove the cone 8 from the hoop 5 and place therein the requisite quantity of ground coffee and then replace the hoop on the bottom of said cone. I next place the cone 10 over the cone 8, securing the same together by means of the pin 12 and slot 13 or other suitable means. I then place the device within the coffee-pot A, which has been previously supplied with a sufficient quantity of boiling water, and then fill the cup or receptacle 14 with chipped ice or cold water. The lid of the coffee-pot being closed, such pot is then permitted to remain upon the stove or other suitable place to continue the boiling of the water the requisite length of time. It will be observed that the steam from the boiling water carries with it the aroma of the coffee to the top of the inner cone, and through the perforations therein it escapes to the space between the two cones, and the ice or cold water in the cup or receptacle causes such steam to rapidly condense, and the same runs down upon the inner surface of the outer cone and mixes with the boiling water or fluid within the coffee-pot.

It will be readily understood by those skilled in the art that various modifications and changes may be made in my device without departing from the scope of my invention.

What I claim as new, and desire to secure by Letters Patent, is—

In a coffee-steeper, the combination of the hoop, perforated cone, the cone 10, and outer cup or receptacle attached thereto, all secured together substantially as stated, and for the purposes set forth.

GEORGE E. OVERMAN.

Witnesses:
L. G. SUSEMIHL,
T. A. MURPHY.